(12) United States Patent
Teshima et al.

(10) Patent No.: US 6,835,443 B2
(45) Date of Patent: Dec. 28, 2004

(54) MICROSTRUCTURE ARRAY, AND A MICROLENS ARRAY

(75) Inventors: Takayuki Teshima, Atsugi (JP); Takayuki Yagi, Yokohama (JP); Yasuhiro Shimada, Hadano (JP); Takashi Ushijima, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/449,103

(22) Filed: Jun. 2, 2003

(65) Prior Publication Data

US 2003/0196903 A1 Oct. 23, 2003

Related U.S. Application Data

(62) Division of application No. 09/534,070, filed on Mar. 24, 2000.

(30) Foreign Application Priority Data

Apr. 1, 1999 (JP) .......................................... 11-094434

(51) Int. Cl.$^7$ ............................. B32B 3/00; H01L 23/48
(52) U.S. Cl. ...................... 428/209; 428/901; 257/780; 257/781
(58) Field of Search ................................ 257/780, 781; 428/209, 901, 156, 131

(56) References Cited

U.S. PATENT DOCUMENTS

| | | | |
|---|---|---|---|
| 4,832,799 A | 5/1989 | Knudsen et al. | 204/22 |
| 4,931,148 A | 6/1990 | Kukankis et al. | 204/15 |
| 5,071,359 A | 12/1991 | Arnio et al. | 439/91 |
| 5,466,926 A | 11/1995 | Sasano et al. | 250/216 |
| 5,536,455 A | 7/1996 | Aoyama et al. | 264/1.7 |
| 5,911,863 A | 6/1999 | Vetter et al. | 205/103 |
| 6,284,072 B1 | 9/2001 | Ryan et al. | 156/59 |
| 6,436,265 B1 * | 8/2002 | Shimada et al. | 205/125 |
| 6,503,384 B1 | 1/2003 | Teshima et al. | 205/118 |
| 6,506,623 B2 * | 1/2003 | Teshima et al. | 438/73 |
| 6,548,144 B1 * | 4/2003 | Teshima et al. | 428/138 |

FOREIGN PATENT DOCUMENTS

| | | |
|---|---|---|
| JP | 64-10169 | 2/1989 |
| JP | 1-261601 | 10/1989 |
| JP | 5-303009 | 11/1993 |
| JP | 6-027302 | 2/1994 |
| JP | 8-258051 | 10/1996 |

OTHER PUBLICATIONS

Masahiro Oikawa et al., "A Distributed–Index Planar Micro–Lens Made of Plastics," 20 *Jpn. J. App. Phys.* L51–L54 (Jan. 1981).

D. Daly et al., "The Manufacture of Microlenses by Melting Photoresist", in *Mirolens Arrays*, 23–34 (M.C. Hutley ed., May 1991).

* cited by examiner

*Primary Examiner*—Cathy Lam
(74) *Attorney, Agent, or Firm*—Fitzpatrick, Cella, Harper & Scinto

(57) ABSTRACT

In a method of fabricating an array of microstructures, a substrate with an electrically-conductive portion is provided, an insulating mask layer is formed on the electrically-conductive portion of the substrate, a plurality of openings are formed in the insulating mask layer to expose the electrically-conductive portion, and a first plated or electrodeposited layer is deposited in the openings and on the insulating mask layer by electroplating or electrodeposition. A second plated layer is further formed on the first plated or electrodeposited layer and on the electrically-conductive portion by electroless plating to reduce a size distribution of microstructures over the array.

7 Claims, 6 Drawing Sheets

Annotations on FIG.2D: 6a; 6 contains phosphorus, nickel plated layer; 5 nickel plated layer; 3 insulating mask layer; 2 electrode; 1 silicon wafer; 4 opening.

MICROSTRUCTURE ARRAY, AND A MICROLENS ARRAY

CROSS-REFERENCE TO RELATED APPLICATIONS

This application is a division of copending application Ser. No. 09/534,070, filed Mar. 24, 2000.

BACKGROUND OF THE INVENTION

1. Field of the Invention

The present invention relates to a method for fabricating a microstructure array, a method for fabricating a mold or a master of a mold (in the specification the term "mold" is chiefly used in a broad sense including both a mold and a master of a mold) for forming a microstructure array, a method for fabricating a microstructure array using the mold, and a microstructure array. This invention particularly relates to a mold for forming a microlens array, a method for fabricating the mold, and a method for fabricating the microlens array using the mold.

2. Description of the Related Background Art

A microlens array typically has a structure of arrayed minute lenses each having a diameter from about 2 or 3 microns to about 200 or 300 microns and an approximately semispherical profile. The microlens array is usable in a variety of applications, such as liquid-crystal display devices, optical receivers and inter-fiber connections in optical communcation systems.

Meanwhile, earnest developments have been made with respect to a surface emitting laser and the like which can be readily arranged in an array form at narrow pitches between the devices. Accordingly, there exists a significant need for a microlens array with narrow lens intervals and a large numerical aperture (NA).

Likewise, a light receiving device, such as a charge coupled device (CCD), has been repeatedly decreased in size as semiconductor processing techniques have been developed and advanced. Therefore, also in this field, the need for a microlens array with narrow lens intervals and a large NA is increasing.

In the field of such a microlens, a desirable structure is a microlens with a large light-condensing efficiency which can highly efficiently utilize light incident on its lens surface.

Further, similar desires exist in the fields of optical information processing, such as optical parallel processing-operations, and optical interconnections. Furthermore, active or self-radiating type display devices, such as electroluminescence (EL) panels, have been enthusiastically studied and developed, and a highly-defined and highly-luminous display has been proposed. In such a display, there is a heightened desire for a microlens array which can be produced at a relatively low cost and with a large area, as well as with a small lens size and a large NA.

There are presently a number of prior art methods for fabricating microlenses.

In a prior art microlens-array fabrication method using an ion exchange method (see M. Oikawa, et al., Jpn. J. Appl. Phys. 20(1) L51–54, 1981), a refractive index is raised at plural places in a substrate of multi-component glass. A plurality of lenses are thus formed places with a high-refractive index. In this method, however, the lens diameter cannot be large, compared with the intervals between lenses. Hence, it is difficult to design a lens with a large NA. Further, the fabrication of a large-area microlens araay is not easy since a large scale manufacturing apparatus, such as an ion diffusion apparatus, is required to produce such a microlens array. Moreover, an ion exchange process is needed for each glass, in contrast with a molding method using a mold. Therefore, variations of lens quality, such as a focal length, are likely to increase between lots unless the management of fabrication conditions in the manufacturing apparatus is carefully conducted. In addition to the above, the cost of this method is relatively high, as compared with the method using a mold.

Further, in the ion exchange method, alkaline ions for ion-exchange are indispensable in a glass substrate, and therefore, the material of the substrate is limited to alkaline glass. The alkaline glass is, however, unfit for a semiconductor-based device which needs to be free of alkaline ions. Furthermore, since a thermal expansion coefficient of the glass substrate greatly differs from that of a substrate of a light radiating or receiving device, misalignment between the microlens array and the devices is likely to occur due to a misfit between their thermal expansion coefficients as an integration density of the devices increases.

Moreover, a compressive strain inherently remains on the glass surface which is processed by the ion exchange method. Accordingly, the glass tends to warp, and hence, a difficulty in joining or bonding between the glass and the light radiating or receiving device increases as the size of the microlens array increases.

In another prior art microlens-array fabrication method using a resist reflow (or melting) method (see D. Daly, et al., Proc. Microlens Arrays Teddington., p23–34, 1991), resin formed on a substrate is cylindrically patterned using a photolithography process and a microlens array is fabricated by heating and reflowing the resin. Lenses having various shapes can be fabricated at a low cost by this resist reflow method. Further, this method has no problems of thermal expansion coefficient, warp and so forth, in contrast with the ion exchange method.

In the resist reflow method, however, the profile of the microlens is strongly dependent on the thickness of resin, wetting conditions between the substrate and resin, and the heating temperature. Therefore, variations between lots are likely to occur while fabrication reproducibility per a single substrate surface is high.

Further, when adjacent lenses are brought into contact with each other due to the reflow, a desired lens profile cannot be secured due to the surface tension. Accordingly, it is difficult to achieve a high light-condensing efficiency by bringing the adjacent lenses into contact and decreasing an unused area between the lenses. Furthermore, when a lens diameter from about 20 or 30 microns to about 200 or 300 microns is desired, the thickness of deposited resin must be large enough to obtain a spherical surface by the reflow. It is, however, difficult to uniformly and thickly deposit the resin material having desired optical characteristics (such as refractive index and optical transmissivity). Thus, it is difficult to produce a microlens with a large curvature and a relatively large diameter.

In another prior art method, an original plate of a microlens is fabricated, lens material is deposited on the original plate and the deposited lens material is then separated. The original plate or mold is fabricated by an electron-beam lithography method (see Japanese Patent Application Laid-Open No. 1 (1989)-261601), or a wet etching method (see Japanese Patent Application Laid-Open No. 5 (1993)-303009). In these methods, the microlens can be reproduced by molding, variations between lots are unlikely to occur, and the microlens can be fabricated at a low cost. Further, the problems of alignment error and warp due to the difference in the thermal expansion coefficient can be solved, in contrast with the ion exchange method.

In the electron-beam lithography method, however, an electron-beam lithographic apparatus is expensive and a large investment in equipment is needed. Further, it is difficult to fabricate a mold having a large area more than 100 cm$^2$ (100 cm-square) because the electron beam impact area is limited.

Further, in the wet etching method, since an isotropic etching using a chemical action is principally employed, an etching of the metal plate into a desired profile cannot be achieved if the composition and crystalline structure of the metal plate vary even slightly. In addition, etching will continue unless the plate is washed immediately after a desired shape is obtained. When a minute microlens is to be formed, a deviation of the shape from the desired one is possible due to etching lasting during a period from the time a desired profile is reached to the time the microlens is reached.

Further, there also exists a mold fabrication method using an electroplating technique (see Japanese Patent Application Laid-Open No. 6 (1994)-27302). In this method, an insulating film having a conductive layer formed on one surface thereof and an opening is used, the electroplating is performed with the conductive layer acting as a cathode, and a protruding portion acting as a mother mold for a lens is formed on a surface of the insulating film. The process of fabricating the mold by this method is simple, and cost is reduced. Similar such methods are also disclosed in Japanese Patent Application Laid-Open No. 8 (1996)-258051 and Japanese Patent Publication No. 64 (1989)-10169.

The problem occurring when a plated layer is formed in an opening by the electroplating technique will be described by reference to FIGS. 1A and 1B. FIGS. 1A and 1B illustrate a radius variation or distribution of plated layers 105 formed in a two-dimensional array on a substrate 101. In the above fabrication method using electroplating in an electroplating bath, a distribution or variation of an elecroplating-current density occurs over the substrate 101 due to a pattern of the openings (i.e., the electrode pattern) formed in an insulating mask layer 103 to expose an electrode layer 102. More specifically, the electric field is unevenly concentrated (stronger in a peripheral region than in a central region), and the electroplating growth is hence promoted near the periphery of the pattern of the arrayed openings. As a result, there is a distribution or variation of the size of semispherical microstructures 105 on the substrate. Therefore, when this substrate is used as a mold for forming a microlens array, the specifications of respective microlenses vary over the array.

SUMMARY OF THE INVENTION

An object of the present invention is to provide a method for fabricating a microstructure array (typically a microlens array such as a semispherical microlens array, a flyeye lens and a lenticular lens) with good performance and a reduced size distribution of microstructures flexibly, readily and stably; a method for fabricating a mold for forming a microstructure array; a fabrication method for a microstructure array using the mold, and so forth.

The present invention is generally directed to a method for fabricating an array of microstructures which includes the following steps:

preparing a substrate with an electrically-conductive portion;

forming an insulating mask layer on the electrically-conductive portion;

forming a plurality of openings in the insulating mask layer to expose the electrically-conductive portion;

forming a first plated or electrodeposited layer in the opening and on the insulating mask layer by electroplating or electrodeposition; and forming a second plated layer on the first plated or electrodeposited layer and on the electrically-conductive portion by electroless plating to reduce a size distribution of microstructures over the array.

In the above fabrication method, the first plated layer is formed by electroplating, or the first electrodeposited layer is formed by electrodeposition using an electrodepositable organic compound. The array pattern is typically a two-dimensional array pattern which is periodical in at least a direction, a two-dimensional array pattern which is periodical in four mutually-orthogonal directions, or a periodical stripe pattern. In terms of an influence of the pattern of the conductive portion exposed through the openings on the distribution of a current density at the time of the electroplating or electrodeposition, the array pattern may create a current distribution in which the current density is uneven over the array. Typically, the opening has a circular shape and the microstructure is a semispherical microstructure, or the opening has an elongated stripe shape and the microstructure is a semicylindrical microstructure.

More specifically, the following constructions are possible based on the above fundamental construction.

The second plated layer is formed by electroless plating using an electroless plating solution containing a reducing agent of hypophosphite such as sodium hypophosphite. Thereby, corrosion resistance and wear resistance of the microstructure array can be improved.

The fabrication method may further include a step of forming a third plated layer on the second plated layer by electroplating, or a step of forming a third plated layer on the second plated layer by electroless plating which preferably uses an electroless plating solution containing a reducing agent of hypophosphite. Thereby, corrosion resistance and wear resistance of the microstructure array can be improved.

The third plated layers may be continuously formed at their bottom portions. A flyeye lens can be fabricated by using the microstructure array fabricated by such a method.

In the fabrication method, the first plated or electrodeposited layer and the second plated layer (additionally, the third plated layer) may be formed such that a horizontal bottom diameter or width of a semispherical or semicylindrical microstructure is approximately in a range from 1 $\mu$m to 200 $\mu$m. Such a minute microlens array is strongly desired with accurate size, good controllability and high stability, and the fabrication method of this invention can meet this desire.

In the fabrication method, the first plated or electrodeposited layer and the second plated layer (additionally, the third plated layer) may be formed such that a distribution of horizontal bottom diameters or widths of semispherical or semicylindrical microstructures (in this specification, the distribution is used as a ratio of a difference between a maximum value and a minimum value relative to the minimum value concerning the size of microstructures) is approximately less than 20%. When the size distribution takes such a value, the microstructure array, such as a mold for forming a microlens array, is of practical use.

In the fabrication method, the first plated or electrodeposited layer may be formed such that a ratio of a horizontal bottom diameter or width of the first plated or electrodeposited layer relative to a horizontal bottom diameter or width of a semispherical or semicylindrical microstructures is approximately less than 0.5. When such a condition is satisfied, a satisfactory size distribution can be readily achieved. As the thickness of the electroless plated layer in a vertical direction increases relative to the entire thickness or radius in the vertical direction of the microstructure, the size distribution of the microstructures decreases. Therefore, in order to better achieve a small distribution, a thickness ratio of the electroless plated layer relative to the entire microstructure is preferably as large as possible. On the other hand, the process speed of the electroless plating is lower than that of the electroplating or electrodeposition. The above ratio is determined considering the above factors.

In the fabrication method, the first plated or electrodeposited layer may be formed such that a diameter or width of the first plated or electrodeposited layer is approximately less than 10 $\mu$m. Thereby, the microstructure array with microstructures having a bottom diameter or width approximately in a range from 1 $\mu$m to 200 $\mu$m can be readily achieved with a preferable distribution.

The fabrication method can further include a step of forming a mold on the substrate with the first plated or electrodeposited layer and the second plated layer (additionally, the third plated layer) by, for example, electroplating, and a step of separating the mold from the substrate. Thereby, a mold for forming a microstructure array such as a microlens array can be fabricated.

The fabrication method can further include a step of coating the substrate having the first plated or electrodeposited layer and the second plated layer (additionally, the third plated layer) with a first resin, a step of hardening the first resin, a step of separating the first resin from the substrate, and a step of coating the hardened first resin with a second resin having a refractive index different from a refractive index of the first resin. Thereby, a preferable microlens array can be fabricated.

The present invention is also directed to a microstructure array including the following:

a substrate having an electrically-conductive portion;

an insulating mask layer formed on the electrically-conductive portion, in which a plurality of openings are formed to expose the electrically-conductive portion;

a first plated or electrodeposited layer formed in the opening and on the insulating mask layer by electroplating or electrodeposition; and a second plated layer formed on the first plated or electrodeposited layer and on the electrically-conductive portion by electroless plating.

Also in this microstructure array, the above specific structures may be adopted. The microstructure array is typically a mold for forming a microlens array, a lenticular lens or a flyeye lens.

These advantages and others will be more readily understood in connection with the following detailed description of the more preferred embodiments in conjunction with the drawings.

DESCRIPTION OF THE PREFERRED EMBODIMENTS (First Embodiment)

A first embodiment of a method for fabricating a semispherical microstructure array will be described by reference to FIGS. 2A to 2D.

Initially, a silicon wafer of 1 inch in diameter is thermally oxidized using an oxidizing gas, and layers of silicon dioxide with a thickness of 1 $\mu$m are formed on opposite surfaces of the wafer. This wafer is used as a substrate 1 illustrated in FIGS. 2A to 2D. Cr and Au are continuously layered with thicknesses of 10 nm and 200 nm on the above wafer, respectively, using an electron beam vacuum-evaporation method which is a suitable thin-film forming method. An electrode layer 2 is thus formed.

Figure 1A:
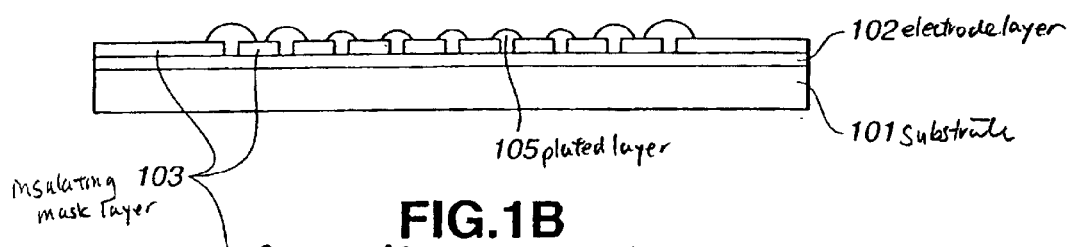
FIGS. 1A and 1B are a cross-sectional view and a plan view illustrating a conventional microstructure array formed on a substrate, respectively.
Figure 1B:
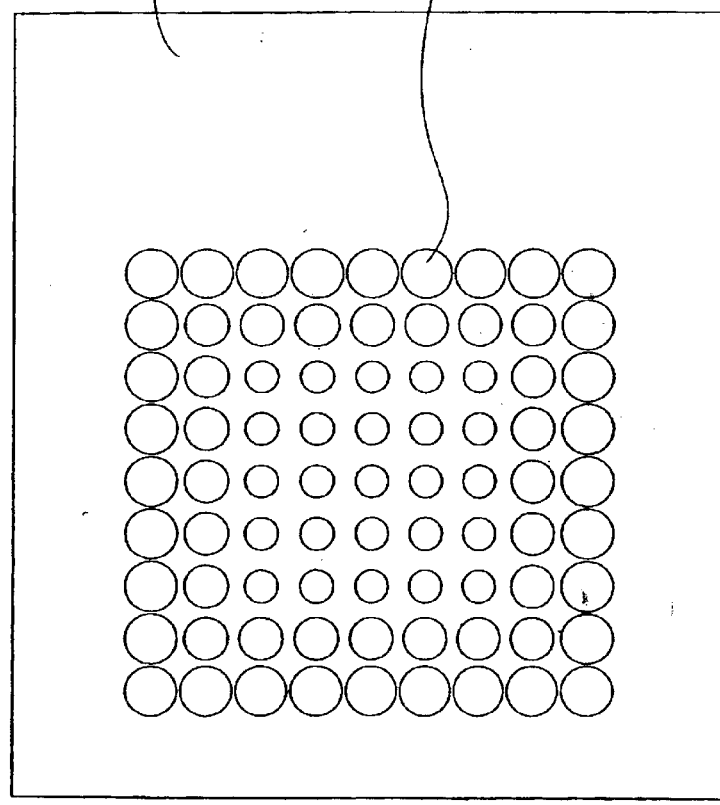
Figure 2A:
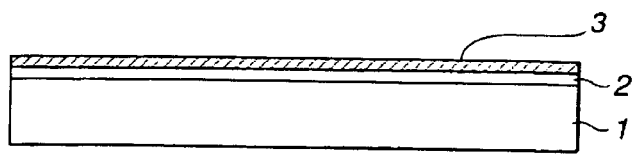
FIGS. 2A to 2D are cross-sectional views illustrating fabrication steps of a method for fabricating a microlens array mold or the like of first and second embodiments according to the present invention, respectively.
Figure 2B:
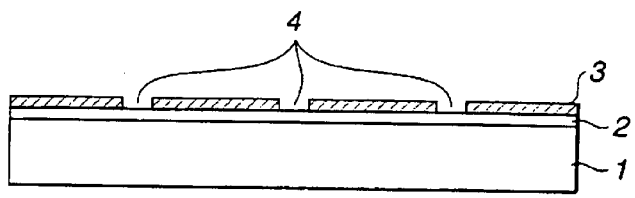

A photoresist is then deposited as an insulating mask layer 3 as illustrated in FIG. 2A. Openings 4 are then formed in the mask layer 3 by photolithography using exposure and development. A plurality of the openings 4 are thus formed in a two-dimensional matrix array of 700×700 to expose the electrode layer 2 as illustrated in FIG. 2B. The opening 4 has a circular shape and a diameter of 5 $\mu$m. Intervals between the adjacent openings 4 are 25 $\mu$m.

Figure 2C:
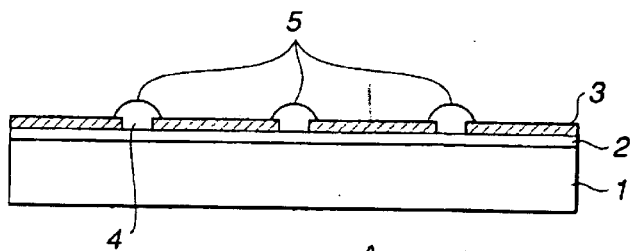
Figure 3:
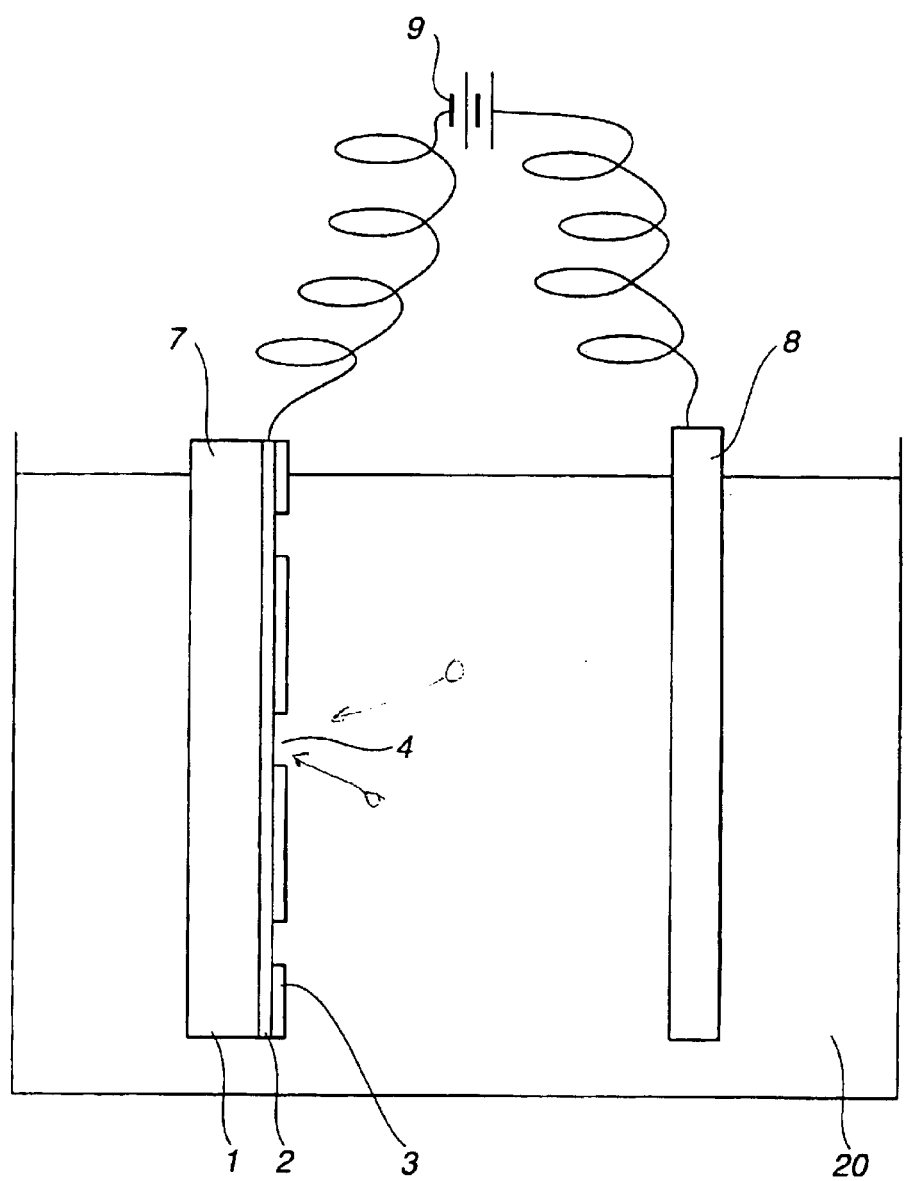
FIG. 3 is a view illustrating an electroplating apparatus used in the present invention.

Ni (nickel) electroplating is then performed for sixty (60) seconds at a bath temperature of 50° C. and a cathodic current density of 40 A/dm$^2$. The above substrate 1 for electroplating is used as a base 7, and the electrode layer 2 is used as a cathode as illustrated in FIG. 3. Ni electroplating bath 20 containing nickel (II) sulfate, nicel (II) chloride, boric acid and brightener is used. Ni plated layer 5 is initially deposited in the opening 4 and grown therein. The plated layer 5 expands onto the mask layer 3. The semispherical or semicylindrical plated layer 5 is deposited until a diameter of its bottom portion 6a reaches 11 $\mu$m in a central portion of the array, as illustrated in FIG. 2C. In FIG. 3, an external electric power source 9 is connected between the base 7 and an anodic plate 8.

Figure 2D:
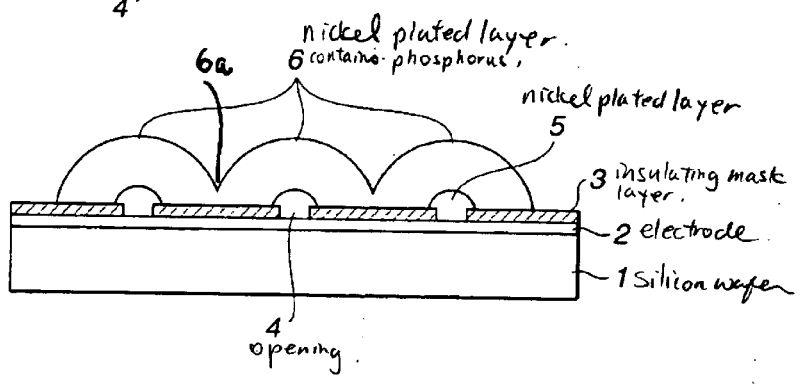

Ni electroless plating is then performed at a bath temperature of 90° C. to form electroless plated layers 6 as illustrated in FIG. 2D. Ni electroless plating solution (S-780 (trade name) produced by Nihon Kanizen Com.) containing a reducing agent of hypophosphite is used.

The Ni plated layer 6 obtained by the electroless plating contains phosphorus. When measured, a diameter of a bottom portion of the plated layers 5 and 6 in the central portion of the array was 21 $\mu$m and a diameter ratio of the electroplated layer 5 relative to the plated layers 5 and 6 was 0.52. At this time, a diameter of a bottom portion of the plated layers 5 and 6 in a peripheral portion of the array was 27 $\mu$m (the maximum value). A distribution of diameters of bottoms of the plated layers in central and peripheral portions of the array (i.e., a ratio of a difference between maximum and minimum diameters relative to the minimum diameter) was about 28%.

For comparison with the above, the above Ni electroless plating was conducted from beginning to end until the diamter of a bottom portion of a plated layer in a central portion of the array reached 21 μm. When diameters of bottoms of the plated layers in several regions of the array were measured, the maximum diameter was found to be 33 μm in the peripheral portion of the array and the distribution of diameters of bottoms of the plated layers was found to be about 55%. It can be seen therefrom that a mold for forming a microlens array with a reduced diameter distribution (reduced to 28% from 55%) can be fabricated in this embodiment.

As described in the foregoing, in the mold of this embodiment, the distribution or variation of the semispherical or semicylindrical plated layers is decreased by the formation of the electroless plated layer on the electroplated layer. Further, since the electroless plated layer 6 contains phosphorus, corrosion resistance and wear resistance of the mold are improved as compared with those of a mold produced by using only electrodeposition or electroplating.

Any material, such as metal, semiconductor (a silicon wafer or the like) and insulating substance (such as glass, quartz and polymer film), can be used as the substrate material. When the metal material is used as the substrate 1, there is no need to form the electrode layer 2. Further, when the semiconductor is used, the electrode layer is not necessarily needed if the semiconductor has enough conductivity to enable electroplating. However, where metal or semiconductor is used as the substrate, a plated layer will also be formed on a portion other than the microstructure forming portion, since the entire substrate is immersed in the electroplating solution. Therefore, when the plated layer is to be formed only on a predetermined portion, the insulating substance can be preferably used as the substrate. Alternatively, a metal or semiconductor, whose surface is partially insulated, may also be used.

Figure 5:
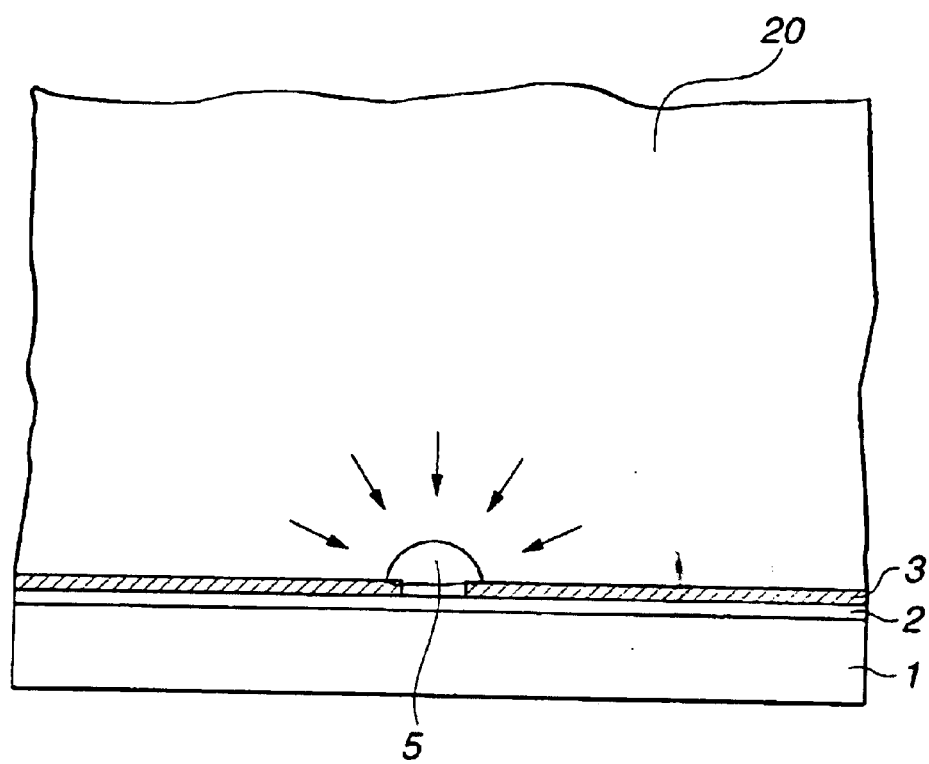
FIG. 5 is a view illustrating a principle of forming a semispherical or semicylindrical microstructure by electroplating or electrodeposition used in the present invention.

Materials of the electrode layer and the substrate are selected from materials which are not corrosive to the electro- or electroless-plating or electrodepositing solution used since the electrode layer is exposed to such a liquid. The mask layer 3 may be formed of any inorganic or organic insulating material that is also anticorrosive to the electro- or electroless-plating or electrodepositing solution. Further, it is preferable that it is harder to deposit the electroless plated layer on the material of the mask layer 3 than on the previously-formed plated or electrodeposited layer when electroless plating is conducted. Such a material is suitable for the mask layer 3. The material of the mask layer 3 is also anticorrosive to the electro- or electroless-plating or electrodepositing solution.

Where the electroplating or electrodeposition is effected at the opening 4 in the electroplating or electrodeposition solution 20 containing ions such as metal ions, ions in the electroplating or electrodeposition solution 20 move toward the plated layer 2, and hence, deposition of the electroplating or electrodeposition proceeds with its growth direction being isotropic, as illustrated in FIG. 5. Thus, a semispherical or semicylindrical layer can be formed. When the size of the opening 4 is sufficiently smaller than the size of the anodic plate 8 and ions are uniformly dissolved in the electroplating or electrodeposition solution 20, the growth direction of the plated layer is isotropic. Typically, a microlens array has a structure of arrayed minute lenses each having a diameter from about 2 or 3 microns to about 200 or 300 microns, and the size of the opening 4 is made smaller than the desired diameter of the microlens. In order to better achieve an isotropic growth of the plated or electrodeposited layer, the size of the opening is less than the diameter of the semispherical structure.

In the case of electroplating, the plated layer is formed by the deposition of metal ions in the electroplating bath caused by the electrochemical reaction. The thickness of the plated layer can be readily controlled by controlling the electroplating time and temperature. The following materials can be used as electroplating metal. For example, as a single metal, Ni, Au, Pt, Cr, Cu, Ag, Zn and the like can be employed. As an alloy, Cu—Zn, Sn—Co, Ni—Fe, Zn—Ni and the like can be used. Any material can be used so long as electroplating is possible.

As the electrodeposition substance electrodeposited using a current and the base 7 in a conventional electrodeposition apparatus, there can be employed electrodepositable organic compound (acryl-series carboxylic acid resin and the like in the case of the anionic-type electrodeposition, and epoxy-series resin and the like in the case of the cationic-type electrodeposition).

Figure 4:
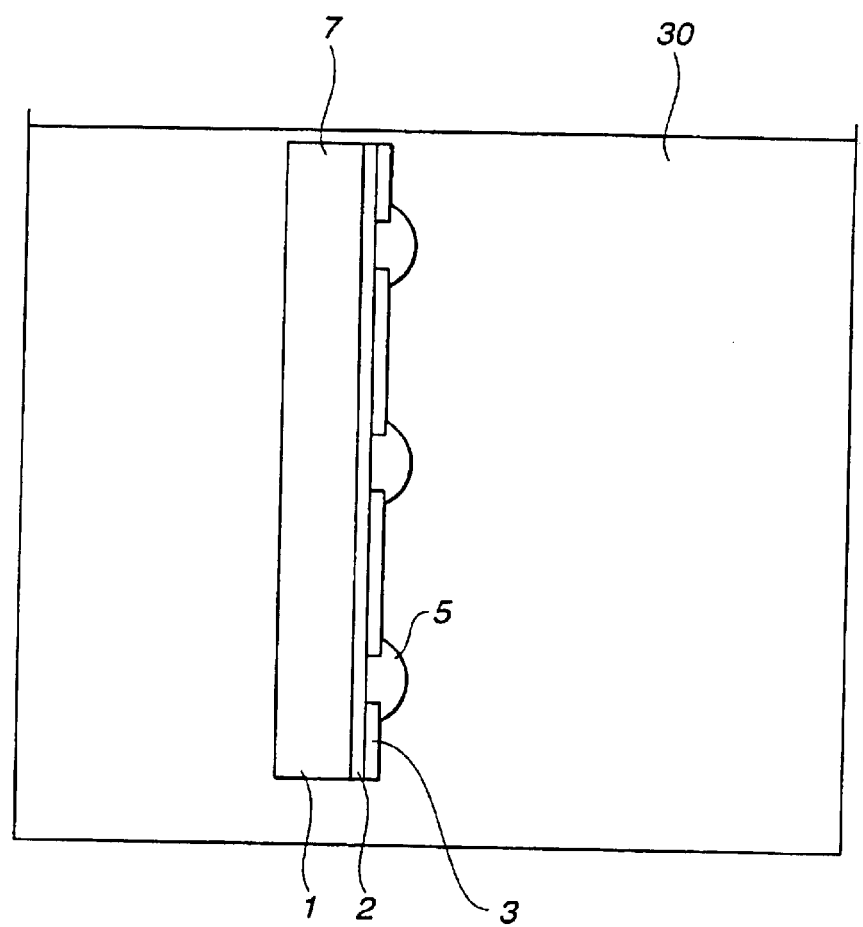
FIG. 4 is a view illustrating an electroless plating apparatus used in the present invention.

FIG. 4 illustrates an electroless plating apparatus. The electroless plated layer 6 is grown on the semispherical or semicylindrical plated or electrodeposited layer 5 until a desired radius is reached. The diameter distribution of final microstructures results from the plated or electrodeposited layer, but not from the electroless plated layer. The deposition mechanism of the electroless plated layer is due to an oxidation-reduction reaction of metallic salt that requires no current for deposition of the plated layer. The electroless plated layers 6 uniformly grow over the entire array. Electroless plating is stopped when the substrate is taken out of electroless plating liquid 30 and washed by water after the desired profile is achieved.

In the case of electroless plating, the thickness of the plated layer 6 can be readily controlled by controlling electroless plating time and temperature. The following materials can be used as electroless plating metal, for example. As a single metal, Ni, Au, Cu, Co and the like can be employed. As an alloy, Co—Fe, Co—W, Ni—Co, Ni—Fe, Ni—W and the like can be used. Any material can be used so long as electroless plating is possible.

As the reducing agent, sodium hypophosphite, potassium hypophosphite, sodium borohydride, potassium borohydride, hydrazine, formalin, tartaric acid and the like can be employed. When sodium hypophosphite or potassium hypophosphite is used as the reducing agent, the electroless plated layer contains phosphorus. Hence, corrosion resistance and wear resistance of the plated layer can be improved.

As discussed above, profiles of plated or electrodeposited layers can be readily controlled by controlling processing time and temperature, so the method has excellent controllability. When the electroless plating after the initial electroplating or electrodeposition is stopped immediately before the desired profile is reached and the plated layer of electroplating material with high corrosion resistance and hardness is then grown until the desired profile is achieved, a microstructure array such as a mold for a microlens array with high corrosion resistance and hardness can be obtained.

A process of forming a microlens array by using the above structure will be described. A resin of ultraviolet-ray hardening photopolymer is deposited on a mold for a microstructure array obtained by the above fabrication method. After a support substrate of glass is placed on the resin, the resin is hardened by exposing the resin to ultraviolet rays. The resin of a microlens array can be separated from the substrate with the microstructure array by lifting the glass substrate. Thus, a concave resin of the microstructure array can be formed.

Another resin with a larger refractive index than that of the above resin is further dropped on the concave resin, and the resin is hardened. Thus, a plane microlens array can be obtained.

In the above method, alkaline glass is not indispensable for forming a microlens, so that materials of the microlens and the substrate are less restricted than in the ion exchange method.

The above microlens array may be fabricated by other methods, such as a method in which a conventional thermoplastic resin is used and a heated mold is stamped on this resin; a method in which a thermosetting resin is laid over a mold and then heated to be hardened; and a method in which an electron-beam hardening resin is coated on a mold and the resin is hardened by electron beam irradiation.

A fabrication process of forming a mold for forming a microlens array by using the above structure will be described.

This fabrication method may further include a step of forming a mold on the the substrate obtained by the above fabrication method, and a step of separating the mold from the substrate. In this case, the mold may be formed using electroplating. Then, a convex microlens array is fabricated by molding using the mold.

In this fabrication method, a plurality of molds with the same profile can be readily fabricated since the mold is formed by molding. In this embodiment, a plurality of molds for a microlens array with the same profile can be fabricated using the same mold master.

After ultraviolet-ray hardening resin of photopolymer is laid over the mold for a convex microlens array fabricated by the above method, a glass substrate as a supporting substrate is then placed on the resin. The resin is exposed to ultraviolet rays through the glass to be hardened. After that, the glass with the resin is separated from the mold. Thus, a convex microlens array is obtained. A plurality of microlens arrays of photopolymer could be formed by repeating the same steps using the same mold.

The above microlens array may also be fabricated by other methods, such as the above-described methods using thermoplastic resin, thermosetting resin and electron-beam hardening resin.

In this method, the mold can be directly formed by electroplating or the like. Therefore, no expensive equipment is needed, costs can be reduced, and the size of the mold can be enlarged readily. Furthermore, the size of the plated layer can be controlled in situ, and the lens diameter and the like can be readily and precisely controlled by controlling processing time and temperature.

(Second Embodiment)

A second embodiment of a fabrication method of a semispherical microstructure array will be described by reference to FIGS. 2A to 2D as the first embodiment is described.

Initially, electrode layer 2, mask layer 3 and openings 4 are formed on a substrate 1 as in the first embodiment.

Ni (nickel) electroplating is then performed for ten (10) seconds at a bath temperature of 50° C. and a cathodic current density of 40 A/dm$^2$. The above substrate 1 for electroplating is used as a base 7, and the electrode layer 2 is used as the cathode as illustrated in FIG. 3. Ni electroplating bath containing nickel (II) sulfate, nickel (II) chloride, boric acid and brightener is used. Thus, semispherical or semicylindrical plated layers 5 are deposited until a diameter of its bottom portion reaches 6 μm in a central portion of the array, as illustrated in FIG. 2C.

Ni electroless plating is then performed at a bath temperature of 90° C. to form electroless plated layers 6 as illustrated in FIG. 2D. Ni electroless plating solution (S-780) containing a reducing agent of hypophosphite is used.

The Ni plated layer 6 obtained by the electroless plating contains phosphorus. When measured, a diameter of a bottom portion of the plated layers 5 and 6 in the central portion of the array was 21 μm and a diameter of a bottom portion of the plated layers 5 and 6 in a peripheral portion of the array was 23 μm (the maximum value). The distribution of diameters of bottoms of the plated layers in central and peripheral portions of the array was about 10%. The diameter distribution of the second embodiment is smaller than that of the first embodiment because a ratio of the electroplated layer 5 to the plated layers 5 and 6 is reduced in the second embodiment.

Also in the mold of this embodiment, the distribution or variation of the semispherical or semicylindrical plated layers is decreased by the formation of the electroless plated layer on the electroplated layer. Further, since the electroless plated layer 6 contains phosphorus, corrosion resistance and wear resistance of the mold are improved as compared with those of a mold produced by using only electrodeposition or electroplating.

(Third Embodiment)

A third embodiment of a method for fabricating a semispherical microstructure array will be described by reference to FIGS. 6A to 6E.

Figure 6A:
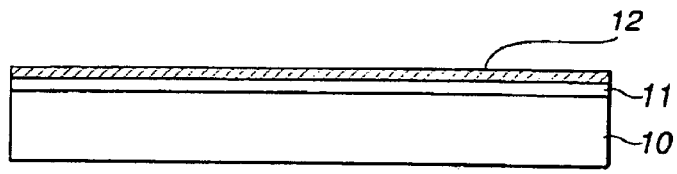
FIGS. 6A to 6E are cross-sectional views illustrating fabrication steps of a fabrication method of fabricating a microlens array mold or the like of third and fourth embodiments according to the present invention, respectively.
Figure 6B:
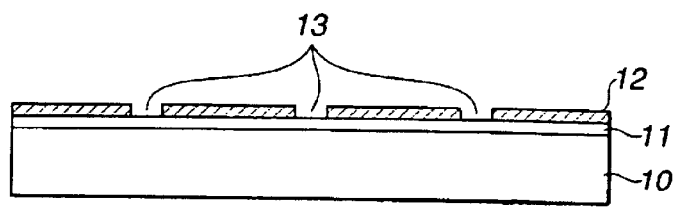

Initially, electrode layer 11, mask layer 12 and openings 13 are formed on a substrate 10 as illustrated in FIGS. 6A and 6B similarly to the first embodiment.

Figure 6C:
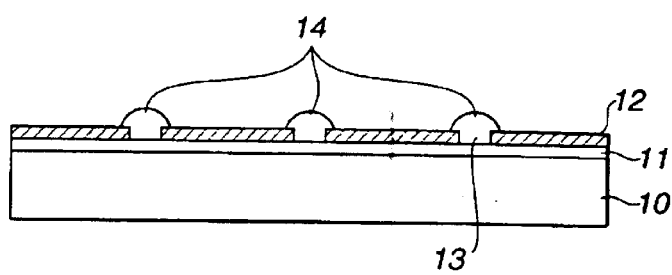

A Cu (copper) electroplating is then performed for two (2) minutes at a bath temperature of 55° C. and a cathodic current density of 4 A/dm$^2$ as illustrated in FIG. 3. The above substrate 10 for electroplating is used as a base 7, and the electrode layer 11 is used as the cathode. A Cu electroplating bath containing copper sulfate, sulfuric acid, hydrochloric acid and brightener is used. A Cu plated layer 14 is initially deposited in the opening 13 and grown therein. The plated layer 14 expands onto the mask insulating layer 12 as illustrated in FIG. 6C. The plated layer 14 is deposited until a diameter of its bottom portion reaches 6 μm in a central portion of the array.

Figure 6D:
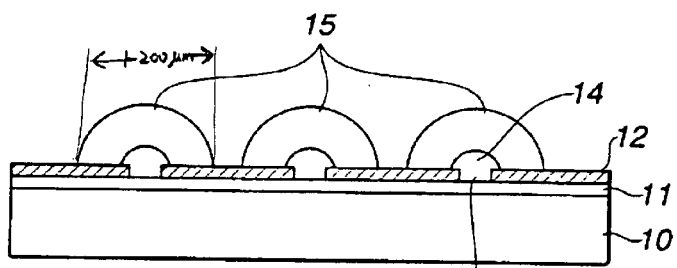

A Au (gold) electroless plating is then performed at a bath temperature of 93° C. to form electroless plated layers 15 as illustrated in FIG. 6D. A Au (gold) electroless plating solution containing potassium gold cyanide, ammonium chloride, sodium citrate and sodium hypophosphite is used.

The Au plated layers 15 obtained by the electroless plating contains phosphorus. The electroless plated layer 15 is deposited until a diameter of its bottom portion reaches 15 μm in the central portion of the array.

Figure 6E:
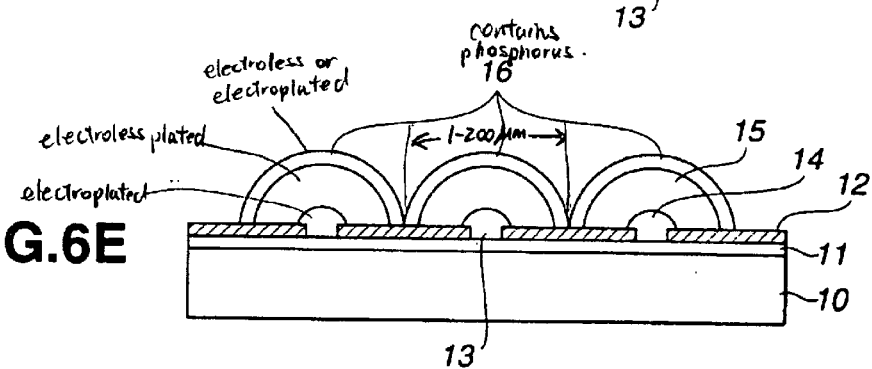
Figure 1A:
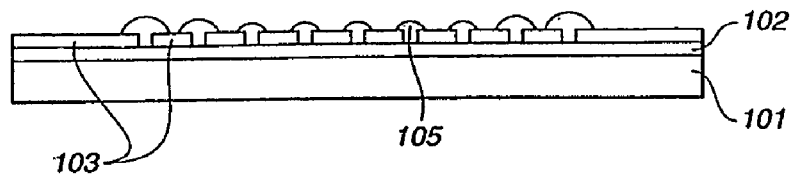
Figure 1B:
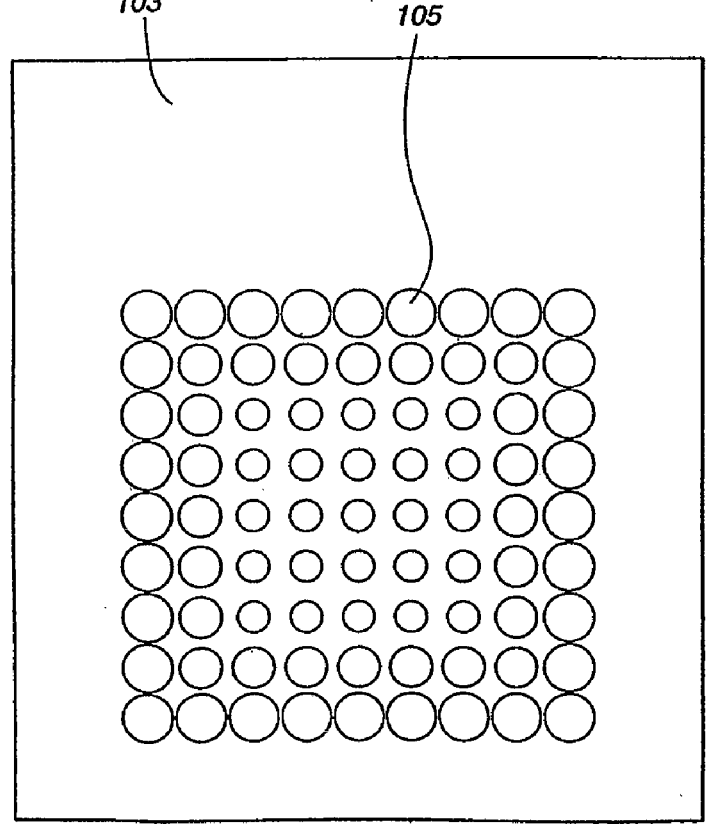
Figure 2A:
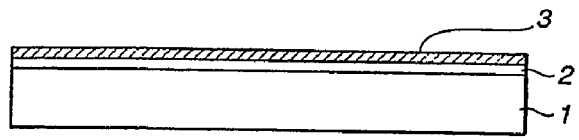
Figure 2B:
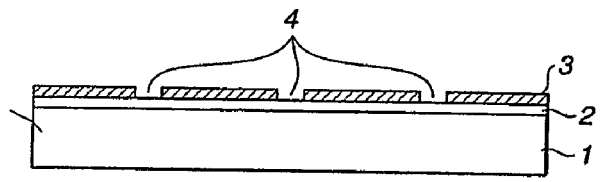
Figure 2C:
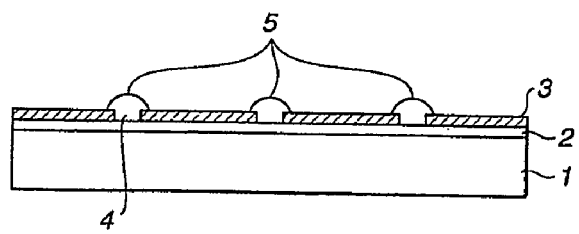
Figure 2D:
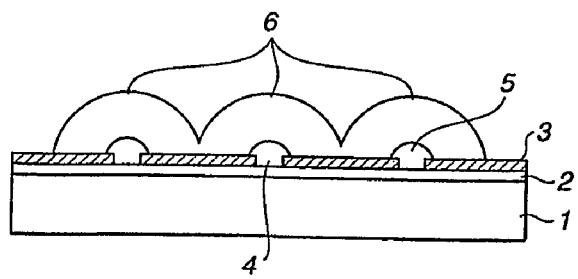
Figure 6A:
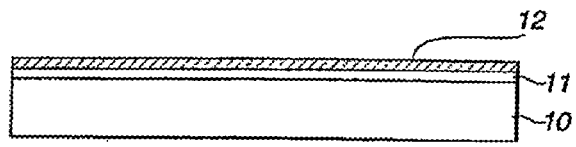
Figure 6B:
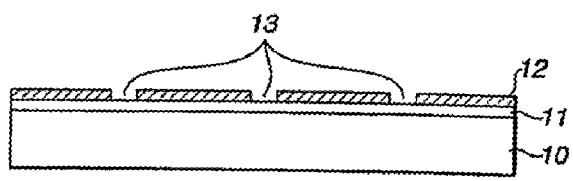
Figure 6C:
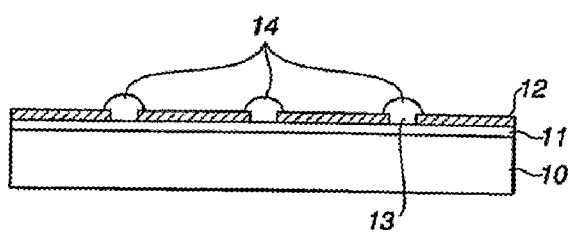
Figure 6D:
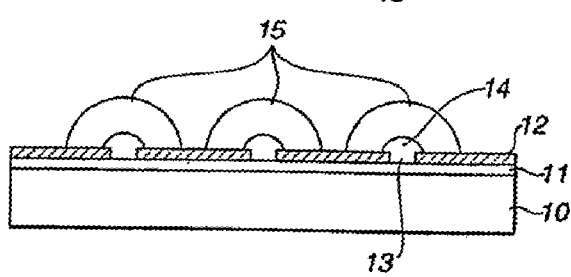
Figure 6E:
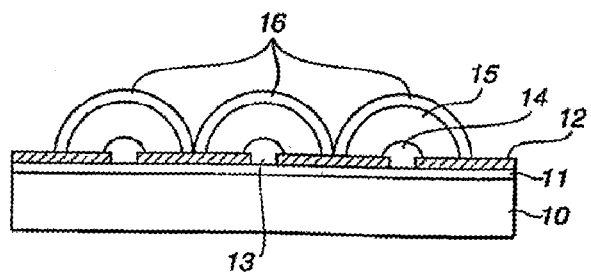

A Cr (chromium) electroplating is then performed for sixty (60) seconds at a bath temperature of 50° C. and a cathodic current density of 4 A/dm$^2$ to form a plated layer 16 and hence improve the corrosion resistance of the plated layer, as illustrated in FIG. 6E. The above electroless plated layer 15 is used as the cathode. A Cr electroplating bath containing chromic acid and sulfuric acid is used. Thus, the Cu plated layer 14 formed by electroplating, the Au electroless plated layer 15 containing phosphorus, and the Cr plated layer 16 formed by electroplating are deposited on the electrode layer 11 in this order.

When measured, a diameter of a bottom portion of the plated layers 14, 15 and 16 in the central portion of the array was 20 μm and a diameter of a bottom portion of the plated layers 14, 15 and 16 in a peripheral portion of the array was 24 μm (the maximum value). The distribution of the diameters of the bottoms of the plated layers in central and peripheral portions of the array was about 20%.

Also in the mold of this embodiment, the distribution or variation of the semispherical or semicylindrical plated layers is decreased by the formation of the electroless plated layer on the electroplated layer. Further, since the chromium plated layer 16 is formed on the surface, hardness of the mold is improved.

(Fourth Embodiment)

A fourth embodiment of a method of fabricating a semispherical microstructure array will be described by reference to FIGS. 6A to 6E.

Initially, electrode layer 11, mask layer 12 and openings 13 are formed on a substrate 10 as illustrated in FIGS. 6A and 6B, similarly to the third embodiment.

Ni electroplating is then performed for ten (10) seconds at a bath temperature of 50° C. and a cathodic current density of 40 A/dm$^2$. The above substrate 10 for electroplating is used as a base 7, and the electrode layer 11 is used as the cathode as illustrated in FIG. 3. Ni electroplating bath containing nickel (II) sulfate, nickel (II) chloride, boric acid and brightener is used. Thus, semispherical or semicylindrical plated layers 14 are deposited until a diameter of its bottom portion reaches 6 μm in a central portion of the array, as illustrated in FIG. 6C.

Ni electroless plating is then performed at a bath temperature of 90° C. to form electroless plated layers 15 as illustrated in FIG. 6D. Ni electroless plating solution (S-780) containing a reducing agent of hypophosphite is used. The Ni plated layers 15 obtained by the electroless plating contain phosphorus. The plated layer 15 is deposited until a diameter of its bottom portion reaches 21 μm in a central portion of the array.

An Au (gold) electroless plating is then performed for two (2) minutes at a bath temperature of 93° C. to form electroless plated layers 16 and hence improve the corrosion resistance of the plated layer, as illustrated in FIG. 6E. The above electroless plated layer 15 is used as the cathode. An Au (gold) electroless plating solution containing potassium gold cyanide, ammonium chloride, sodium citrate and sodium hypophosphite is used.

Thus, the Ni plated layer 14 formed by electroplating, the Ni electroless plated layer 15 containing phosphorus, and the Au electroless plated layer 16 containing phosphorus are deposited on the electrode layer 11 in this order.

When measured, a diameter of a bottom portion of the plated layers 14, 15 and 16 in the central portion of the array was 21 μm and a diameter of a bottom portion of the plated layers 14, 15 and 16 in a peripheral portion of the array was 23 βm (the maximum value). The distribution of diameters of bottoms of the plated layers in central and peripheral portions of the array was about 10%.

Also in the mold of this embodiment, the distribution or variation of the semispherical or semicylindrical plated layers is decreased by the formation of the electroless plated layers on the electroplated layer. Further, since the gold electroless plated layer 16 containing phosphorus is formed on the surface, the corrosion resistance of the surface of the mold is improved.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

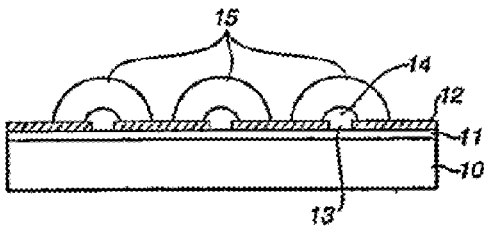

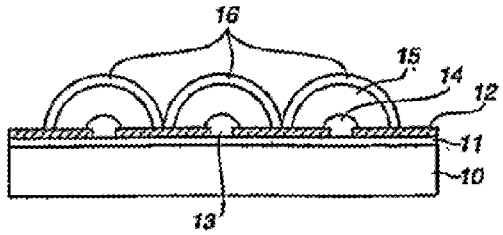

What is claimed is:

1. A microstructure array comprising:
  a substrate having an electrically-conductive portion;
  an insulating mask layer formed on the electrically-conductive portion, a plurality of openings being formed in the insulating mask layer to expose the electrically-conductive portion;
  a first plated or electrodeposited layer formed in the openings and on the insulating mask layer by electroplating or electrodeposition; and
  a second plated layer containing phosphorous formed on the first plated or electrodeposited layer and on the electrically-conductive portion by electroless plating.

2. A microstructure array comprising:
  a substrate having an electrically-conductive portion;
  an insulating mask layer formed on the electrically-conductive portion, a plurality of openings being formed in the insulating mask layer to expose the electrically-conductive portion;
  a first plated or electrodeposited layer formed in the openings and on the insulating mask layer by electroplating or electrodeposition;
  a second plated containing phosphorous layer formed on the first plated or electrodeposited layer and on the electrically-conductive portion by electroless plating; and
  a third plated layer formed on the second plated layer by electroless plating, wherein the third plated layer contains phosphorous.

3. A microstructure array comprising:
  a substrate having an electrically-conductive portion;
  an insulating mask layer formed on the electrically-conductive portion, a plurality of openings being formed in the insulating mask layer to expose the electrically-conductive portion;
  a first plated or electrodeposited layer formed in the openings and on the insulating mask layer by electroplating or electrodeposition; and
  a second plated containing phosphorous layer formed on the first plated or electrodeposited layer and on the electrically-conductive portion by electroless plating, wherein the first plated or electrodeposited layer is formed such that a ratio of a diameter or width of the first plated or electrodeposited layer relative to a diameter or width of a semispherical or semicylindrical microstructures of said second plated layer, is approximately less than 0.5.

4. A microstructure array comprising:
  a substrate having an electrically-conductive portion;
  an insulating mask layer formed on the electrically-conductive portion, a plurality of openings being formed in the insulating mask layer to expose the electrically-conductive portion;
  a first plated or electrodeposited layer formed in the openings and on the insulating mask layer by electroplating or electrodeposition, wherein the first plated or electrodeposited layer is formed such that a diameter or width of the first plated or electrodeposited layer is approximately less than 10 μm; and
  a second plated layer formed on the first plated or electrodeposited layer and on the electrically-conductive portion by electroless plating.

5. A microstructure array comprising an array of semispherical or half-cylinder microstructures, wherein a bottom diameter or width of the microstructure in a central portion thereof is smaller than a diameter of the microstructure in a peripheral portion thereof, and wherein the microstructure contains phosphorous.

6. A microstructure array comprising an array of semispherical or half-cylinder microstructures, wherein a bottom diameter or width of the microstructure in a central portion thereof is smaller than a diameter of the microstructure in a peripheral portion thereof, and wherein a bottom diameter of the microstructure is approximately in a range from 1 µm to 200 µm.

7. A microstructure array comprising an array of semispherical or half-cylinder microstructures, wherein a bottom diameter or width of the microstructure in a central portion thereof is smaller than a diameter of the microstructure in a peripheral portion thereof, and wherein a distribution of bottom diameters or widths of semispherical or half-cylinder microstructures between the central portion and the peripheral portion, is 10 to 28%.

* * * * *

UNITED STATES PATENT AND TRADEMARK OFFICE
CERTIFICATE OF CORRECTION

PATENT NO. : 6,835,443 B2
APPLICATION NO. : 10/449103
DATED : December 28, 2004
INVENTOR(S) : Takayuki Teshima et al.

It is certified that error appears in the above-identified patent and that said Letters Patent is hereby corrected as shown below:

ON THE TITLE PAGE [57]:

The Abstract, replace the Figures in the Abstract with Figs. 6D and 6E as shown in attached.

SHEETS 2-6:

Figs.F1-F6E, replace Figs. 1A, 1B, 2D, 6D and 6E with handwritten notes with correct Figs. 1A, 1B, 2D, 6D and 6E as shown in attached.

COLUMN 1:

Line 66, "araay" should read --array--.

COLUMN 6:

Line 42, "nicel" should read --nickel--.

COLUMN 11:

Line 51, "23 βm" should read --23 μm--.

Signed and Sealed this

Second Day of October, 2007

JON W. DUDAS
*Director of the United States Patent and Trademark Office*

(12) United States Patent
Teshima et al.

(10) Patent No.: US 6,835,443 B2
(45) Date of Patent: Dec. 28, 2004

(54) MICROSTRUCTURE ARRAY, AND A MICROLENS ARRAY

(75) Inventors: Takayuki Teshima, Atsugi (JP); Takayuki Yagi, Yokohama (JP); Yasuhiro Shimada, Hadano (JP); Takashi Ushijima, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/449,103

(22) Filed: Jun. 2, 2003

(65) Prior Publication Data
US 2003/0196903 A1 Oct. 23, 2003

Related U.S. Application Data

(62) Division of application No. 09/534,070, filed on Mar. 24, 2000.

(30) Foreign Application Priority Data

Apr. 1, 1999 (JP) ............................ 11-094434

(51) Int. Cl.⁷ ............................ B32B 3/00; H01L 23/48
(52) U.S. Cl. ............................ 428/209; 428/901; 257/780; 257/781
(58) Field of Search ............................ 257/780, 781; 428/209, 901, 156, 131

(56) References Cited

U.S. PATENT DOCUMENTS

| | | | |
|---|---|---|---|
| 4,832,799 A | 5/1989 | Knudsen et al. | 204/22 |
| 4,931,148 A | 6/1990 | Kukanskis et al. | 204/15 |
| 5,071,359 A | 12/1991 | Arnio et al. | 439/91 |
| 5,466,926 A | 11/1995 | Sasano et al. | 250/216 |
| 5,536,455 A | 7/1996 | Aoyama et al. | 264/1.7 |
| 5,911,863 A | 6/1999 | Vetter et al. | 205/103 |
| 6,284,072 B1 | 9/2001 | Ryan et al. | 156/59 |
| 6,436,265 B1 * | 8/2002 | Shimada et al. | 205/125 |
| 6,503,384 B1 | 1/2003 | Teshima et al. | 205/118 |
| 6,506,623 B2 * | 1/2003 | Teshima et al. | 438/73 |
| 6,548,144 B1 * | 4/2003 | Teshima et al. | 428/138 |

FOREIGN PATENT DOCUMENTS

| | | |
|---|---|---|
| JP | 64-10169 | 2/1989 |
| JP | 1-261601 | 10/1989 |
| JP | 5-303009 | 11/1993 |
| JP | 6-027302 | 2/1994 |
| JP | 8-258081 | 10/1996 |

OTHER PUBLICATIONS

Masahiro Oikawa et al., "A Distributed-Index Planar Micro-Lens Made of Plastics," 20 *Jpn. J. App. Phys.* L51–L54 (Jan. 1981).

D. Daly et al., "The Manufacture of Microlenses by Melting Photoresist", in *Microlens Arrays*, 23–34 (M.C. Hutley ed., May 1991).

* cited by examiner

*Primary Examiner*—Cathy Lam
(74) *Attorney, Agent, or Firm*—Fitzpatrick, Cella, Harper & Scinto

(57) ABSTRACT

In a method of fabricating an array of microstructures, a substrate with an electrically-conductive portion is provided, an insulating mask layer is formed on the electrically-conductive portion of the substrate, a plurality of openings are formed in the insulating mask layer to expose the electrically-conductive portion, and a first plated or electrodeposited layer is deposited in the openings and on the insulating mask layer by electroplating or electrodeposition. A second plated layer is further formed on the first plated or electrodeposited layer and on the electrically-conductive portion by electroless plating to reduce a size distribution of microstructures over the array.

7 Claims, 6 Drawing Sheets